No. 737,932. PATENTED SEPT. 1, 1903.
H. A. HUMPHREY.
CENTRIFUGAL APPARATUS FOR PURIFYING GASES.
APPLICATION FILED AUG. 11, 1902.
NO MODEL. 2 SHEETS—SHEET 1.
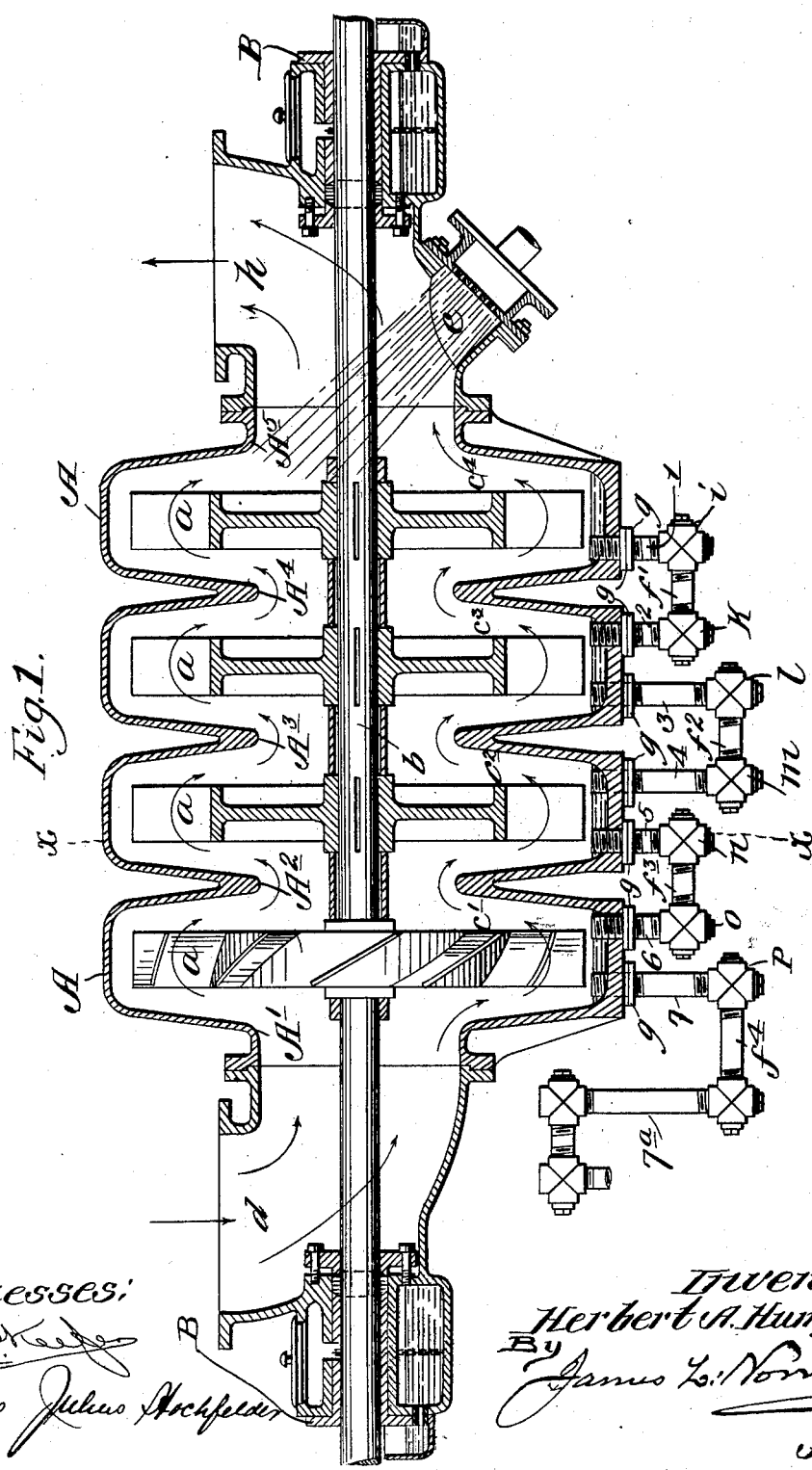

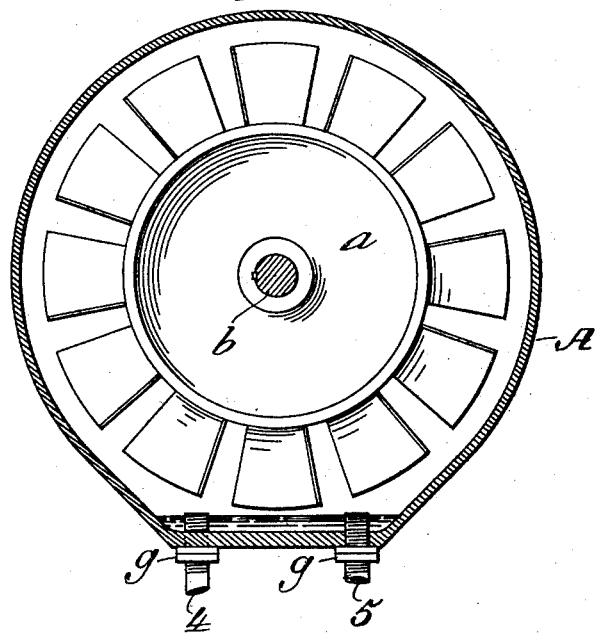

No. 737,932. Patented September 1, 1903.

UNITED STATES PATENT OFFICE.

HERBERT A. HUMPHREY, OF WESTMINSTER, ENGLAND.

CENTRIFUGAL APPARATUS FOR PURIFYING GASES.

SPECIFICATION forming part of Letters Patent No. 737,932, dated September 1, 1903.

Application filed August 11, 1902. Serial No. 119,333. (No model.)

*To all whom it may concern:*

Be it known that I, HERBERT ALFRED HUMPHREY, a citizen of England, residing at 38 Victoria street, Westminster, in the county of London, England, have invented a certain new and useful Centrifugal Apparatus for Purifying Gases, (for which I have applied for a patent in Great Britain, dated November 2, 1901, No. 22,131,) of which the following is a specification.

This invention, which originally formed a part of my application Serial No. 106,037, relates to certain new and useful improvements in apparatus for purifying gases and in which the gases are caused to travel through a series of chambers or compartments each provided with a centrifugal fan. These chambers or compartments are arranged in such relation to each other that the gases owing to the action of the fans are delivered from one chamber or compartment to an adjacent chamber or compartment. Each of the chambers or compartments is supplied with a suitable quantity of water flowing in a direction opposite to that direction in which the gases travel, and the chambers or compartments are further provided with an adjustable means, hereinafter set forth, to permit the passage of the water from one chamber or compartment to the other, as well as to increase or decrease the level of the water in each chamber or compartment as occasion requires.

The object of the invention is to construct an apparatus for purifying gases which shall be simple in its construction, strong, durable, efficient in its use, and comparatively inexpensive to set up.

To this end the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts, and in which—

Figure 1 is a longitudinal sectional view of the apparatus, and Fig. 2 is a vertical section through the compartment $C^2$ on the line $x\,x$.

Referring to the drawings by reference characters, A denotes a casing constructed with inwardly-extending portions at various intervals, as at $A'\ A^2\ A^3\ A^4\ A^5$, forming the casing into a series of chambers or compartments $C'\ C^2\ C^3\ C^4$. The bottom of the chambers or compartments are flattened, as shown in Fig. 2. Each end of the casing A is open, and communicating with one open end of the casing A is an inlet-pipe $d$ for the gas, and communicating with the other open end of the casing is an outlet-pipe $h$ for the gases after they have passed through the apparatus. The outlet-pipe $h$ carries a suitable water-spraying device $e$, communicating with a water-supply and adapted to direct water into the casing A. The water when it is caused to enter the casing A by means of the spraying device flows down into the bottom of the chamber or compartment $C^4$ and is directed from said compartment $C^4$ to the adjacent compartments by means of coupling devices, which will now be referred to.

The coupling device between the chambers or compartments $C^3$ and $C^4$ consists of two vertical members 1 2, which are preferably in the form of hollow tubes and screw-threaded at their top and bottom. The lower ends of these vertical members 1 2 are connected together by means of a longitudinal member $f'$, the latter being connected to the lower screw-threaded end of the members 1 2 by means of the three-way couplings $i\ k$. The upper end of the member 1 is adapted to extend through the bottom of and project into the chamber or compartment $C^4$. The upper end of the member 2 is adapted to extend through the bottom of and project into the chamber or compartment $C^3$. The bottoms of the chambers or compartments $C^3\ C^4$ are provided with screw-threaded openings to receive the screw-threaded upper ends of the members 1 and 2.

The coupling device between the chambers or compartments $C^2$ and $C^3$ consists of two vertical members 3 4, which are preferably in the form of hollow tubes and screw-threaded at their top and bottom. The lower ends of these vertical members 3 4 are connected together by means of a longitudinal member $f^2$, the latter being connected to the lower screw-threaded end of the members 3 4 by means of the three-way couplings $l$ $m$. The upper end of the member 3 is adapted to extend through the bottom of and project into the chamber or compartment $C^3$ at the opposite side of said bottom from that at which the member 2 enters said chamber. The upper end of the member 4 is adapted to extend through the bottom of and into the chamber or compartment $C^2$. The bottoms of the chambers or compartments $C^2$ and $C^3$ are provided with screw-threaded openings to receive the screw-threaded upper ends of the members 3 4.

The coupling device between the chambers or compartments $C'$ and $C^2$ consists of two vertical members 5 6, which are preferably in the form of hollow tubes and screw-threaded at their top and bottom. The lower ends of these vertical members 5 6 are connected together by means of a longitudinal member $f^3$, the latter being connected to the lower screw-threaded end of the members 5 6 by means of the three-way couplings $n$ $o$. The upper end of the member 5 is adapted to extend through the bottom of and project into the chamber or compartment $C^2$ at the opposite side of said bottom from that at which the member 4 enters said chamber. The upper end of the member 6 is adapted to extend through the bottom of and extend into the chamber or compartment $C'$. The bottoms of the chambers or compartments $C'$ and $C^2$ are provided with screw-threaded openings to receive the screw-threaded upper ends of the members 5 6.

At the end of the series of chambers or compartments is an outlet for the water, through which the water is caused to flow by the pressure of the incoming gas, the pressure of the gas being greater than atmospheric pressure. This outlet consists of the vertical member 7, which is preferably in the form of a hollow tube and screw-threaded at its upper and lower ends. To the lower screw-threaded end of the member 7 is attached a three-way coupling $p$, which in turn connects the member 7 to any suitable discharge medium, as at $7^a$, by the longitudinal member $f^4$. The upper end of the tube 7 is adapted to extend through the bottom of and project into the chamber or compartment $C'$ at the opposite side of said bottom from that at which the member 6 enters said chamber. The bottom of the chamber or compartment $C'$ is provided with screw-threaded openings to receive the screw-threaded upper ends of tubes 6 and 7. Nuts $g$ are mounted upon the upper ends of the members 1, 2, 3, 4, 5, 6, and 7, below the bottom of the casing A for vertically adjusting said members.

The vertical members of the coupling devices may thus be adjusted, so as to protrude more or less into the chambers or compartments, and thereby vary the level of the water in said chambers or compartments.

Through the casing $a$ extends a shaft $b$, which is journaled in suitable boxes B B, attached to the inlet and outlet pipes $d$ and $h$. These journal-boxes may be of any suitable construction, and it is therefore unnecessary to describe them in detail. Mounted on the shaft $b$ are centrifugal fans $a$ $a$ $a$ $a$, one of said fans being adapted to move in each of the chambers or compartments $C'$, $C^2$, $C^3$, and $C^4$. Each of the fans $a$ consists of a circular disk having diagonally-disposed blades attached thereto.

It is obvious that although the apparatus herein described is expressly designed for bringing gas and liquid into contact for the purpose of purifying the gas it is equally applicable for bringing gases and liquids into contact in order to effect chemical or physical reaction between the gas and the liquid, or even merely to cool the gas.

Having thus described the nature of this invention and the best means I know of carrying the same into practical effect, I claim—

1. A centrifugal apparatus for purifying gases, comprising a casing divided into a plurality of communicating water-containing compartments, and a plurality of forwardly-propelling fans for the gas, one of said fans rotating in each of said compartments, substantially as described.

2. A centrifugal apparatus for purifying gases, comprising a casing divided into a plurality of communicating water-containing compartments, a plurality of forwardly-propelling fans for the gas, one of said fans rotating in each of said compartments, and means for varying the level of the water in the compartments, substantially as described.

3. A centrifugal apparatus for purifying gases, comprising a plurality of chambers, the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of the said plurality of chambers, and an adjustable means communicating with the said chambers for supplying and discharging water thereto and therefrom.

4. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means at the end of the said plurality of chambers, and a series of pipe-couplings connecting each chamber with an adjacent chamber and arranged to conduct the water from one chamber to each succeeding chamber.

5. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of the said plurality of chambers, and a series of vertically adjustable pipe-couplings connecting each chamber with an adjacent chamber for regulating the level of the water in each of the said chambers and arranged to conduct the water from one chamber to each succeeding chamber.

6. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of the said plurality of chambers, and a series of pipe-couplings for conducting the water from one chamber to each succeeding chamber, said pipe-couplings being independently adjustable to regulate the level of the water in each chamber.

7. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of said plurality of chambers, a series of pipe-couplings for conducting the water from one chamber to each succeeding chamber, and means for adjusting said pipe-couplings to regulate the level of the water in each chamber.

8. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of said plurality of chambers, and a series of pipe-couplings for conducting the water from one chamber to the adjacent chamber, the ends of each of the said couplings extending through and projecting beyond the bottoms of said chambers for regulating the level of the water in each of the said chambers.

9. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjacent chamber, a water-supplying means arranged at the end of said plurality of chambers, and a series of pipe-couplings for conducting water from one chamber to each succeeding chamber, the said pipe-couplings having the free ends of their vertical arms threaded and adjustable in openings in the bottom of each of the said chambers for regulating the level of the water in each of said chambers.

10. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjoining chamber, a water-supplying means arranged at the end of the said plurality of chambers, and a series of pipe-couplings connecting each chamber with an adjacent chamber and arranged to conduct the water from one chamber to each succeeding chamber, the said pipe-couplings having the free ends of their vertical arms threaded and adjustable in openings in the bottom of each of said chambers and provided on their upper ends with nuts for fixing their adjustment in said openings and thereby regulating the height of the water in each of said compartments.

11. A centrifugal apparatus for purifying gases, comprising a plurality of chambers the delivery of each chamber opening into the intake of the adjoining chamber, a plurality of forwardly-propelling fans attached to a common shaft, one of said fans moving in each of the said chambers and adapted to forward the gas into the adjoining chamber, a water-supplying means arranged at the end of the said plurality of chambers, and a series of pipe-couplings for conducting the water from one chamber to each succeeding chamber, said pipe-couplings having their free ends extending through and projecting above the bottoms of said chambers and threaded to permit of their adjustment for regulating the level of the water in each of the said compartments.

12. A centrifugal apparatus for purifying gases, comprising a plurality of chambers communicating with each other, a plurality of forwardly-propelling fans for the gas operating within said chambers, a water-supplying means arranged at the end of said plurality of chambers, and an adjustable means communicating with said chambers for supplying and discharging water thereto and therefrom and for varying the level of the water in the said chambers.

13. A centrifugal apparatus for purifying gases, comprising a plurality of chambers communicating with each other and adapted to contain water, a plurality of forwardly-propelling fans for the gas operating within said chambers, and an adjustable means communicating with said chambers for supplying and discharging water thereto and therefrom
5 and for varying the level of the water in the said chambers.

In testimony whereof I have hereunto set my hand in presence of two subscribing witnesses.

H. A. HUMPHREY.

Witnesses:
  GERALD L. SMITH,
  EDWARD GARDNER.